P. B. STREICH.
BUN AND BREAD MOLDER AND ROUNDER.
APPLICATION FILED JAN. 14, 1920.
1,362,057.
Patented Dec. 14, 1920.
2 SHEETS—SHEET 1.
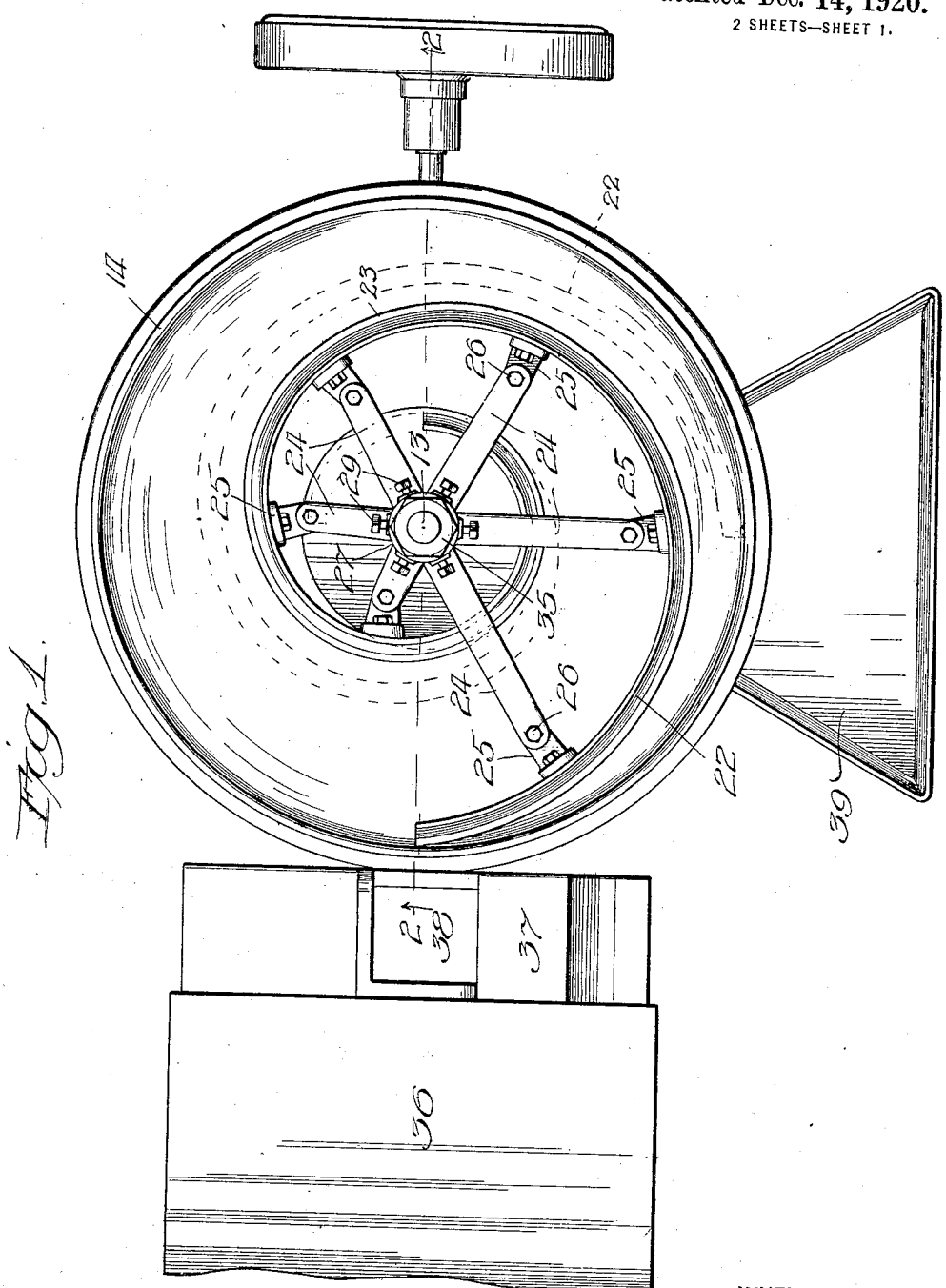
INVENTOR
Paul B. Streich,
BY
Charles C. Shervey
his ATTORNEY

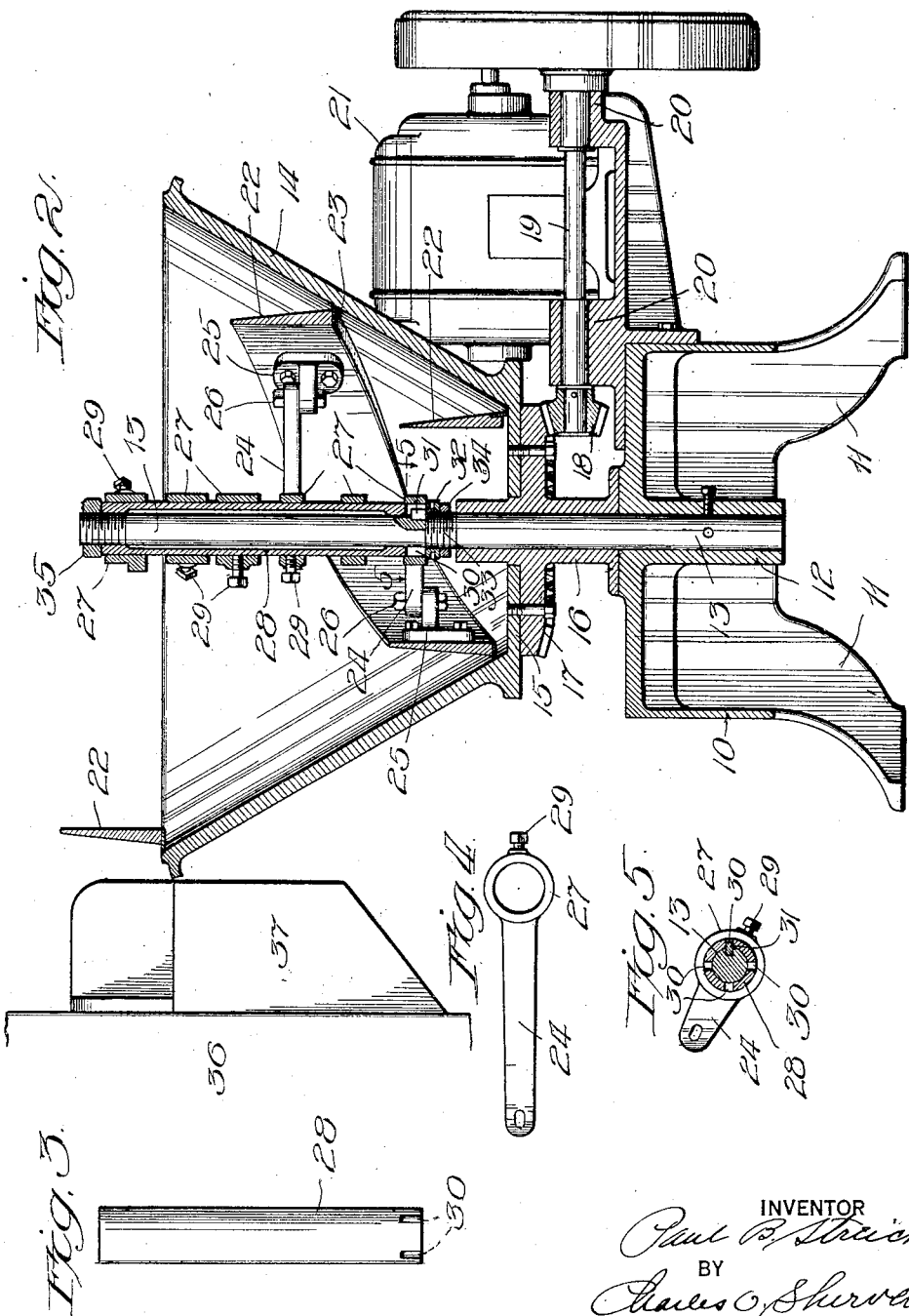

UNITED STATES PATENT OFFICE.

PAUL B. STREICH, OF JOLIET, ILLINOIS, ASSIGNOR TO THE UNION WRAPPING MACHINE COMPANY, OF JOLIET, ILLINOIS, A CORPORATION OF ILLINOIS.

BUN AND BREAD MOLDER AND ROUNDER.

1,362,057.  Specification of Letters Patent.  Patented Dec. 14, 1920.

Application filed January 14, 1920. Serial No. 351,409.

*To all whom it may concern:*

Be it known that I, PAUL B. STREICH, a citizen of the United States, and resident of Joliet, Will county, and State of Illinois, have invented certain new and useful Improvements in Bun and Bread Molders and Rounders, of which the following is declared to be a full, clear, and exact description.

This invention relates to bun and bread molders and rounders of that type which employs a rotary bowl and a stationary mold-board for rounding up the dough. A molder of this type is shown and described in Letters Patent No. 1,152,348, issued August 31, 1915, to Frank Streich, and the present invention is in the nature of an improvement on the machine shown and described in said patent.

In the modern bakery equipments, the rounder is usually placed between the divider or scaler and the proofing apparatus and operates to round up the lumps of dough after they have been weighed and before they are delivered to the proofer. Sometimes a pan or shelf is employed in connection with the rounding up machine upon which the lumps of dough are deposited by the rounder. With former machines it has been quite a task to adjust the mold-board after it has once been set in proper position, so that the mold-board, having once been set to deliver the lumps of dough to a proofer or to a pan or table, was usually left in that position of adjustment. One of the objects of the present invention is to provide simple means whereby the mold-board may be quickly and readily adjusted to cause the lumps of dough to be discharged from the rounder in any desired direction, whereby the rounder may be installed between the divider or scaler and the proofing apparatus, and the mold-board may be set to discharge the lumps of dough into the proofing apparatus, and whereby the mold-board may be quickly and easily adjusted so that it will discharge the lumps of dough on the pan or table or any other receptacle, from which they may be readily removed by an attendant. The invention consists in the several novel features hereinafter fully set forth and pointed out in the claims.

The invention is clearly illustrated in the drawing accompanying this specification, in which Figure 1 is a plan of a dough molder and rounder embodying a simple form of the present invention, and showing a fragment of a proofing apparatus adjacent thereto; Fig. 2 is a vertical, longitudinal section taken at the line 2—2 of Fig. 1 and showing a fragment of the proofing apparatus in side elevation; Fig. 3 is a side elevation of a certain sleeve forming a part of this invention; Fig. 4 is a plan of a certain mold-board supporting arm; and Fig. 5 is a horizontal section taken on the line 5—5 of Fig. 2.

Referring to said drawings, the reference character 10 designates a base having supporting legs 11 and formed with a centrally located, hollow boss 12 in which is stationarily secured a shaft or post 13. Rotatably supported upon the base 10 is a carrier 14, here shown in the form of a bowl having the shape of a frustum of a hollow cone, the upper end of which is open and the lower end of which is closed by a bottom 15 to which is secured a hub 16 which rests upon the top of the base 10. Any suitable means may be provided for rotating the carrier 14. I have shown a beveled gear wheel 17 formed upon the hub 16, which beveled gear wheel meshes with a pinion 18 fastened on a drive shaft 19 journaled in a bearing bracket 20, and arranged to be driven from any suitable source of power, as for instance an electric motor 21 which may be mounted upon the base or a suitable bracket secured thereto.

Stationarily mounted upon the shaft or post 13 is the mold-board 22 which is preferably of spiral formation, extending from the bottom 15 of the bowl to the upper edge thereof and coöperating with the bowl to round up the dough. To obtain the best results it is preferred that the spiral mold-board have a straight side, forming with the inner face of the bowl a groove approximately V-shaped in cross section. A knife or scraper 23 is usually provided on the lower edge of the mold-board 22 and it forms a neat contact with the inner face of the bowl. A number of arms 24 are provided for stationarily supporting the mold-board, and said arms may be attached to the mold-board by brackets 25 bolted or otherwise secured to the mold-board and connected to the arms by bolts and nuts 26. Said arms 24 extend radially from the shaft 13 to the mold-board and are formed with hubs 27 that surround and are permanently secured to a supporting sleeve 28 by bolts 29 threaded in the hubs 27 and bearing against the sleeve. The sleeve surrounds the shaft 13 and is secured thereon against rotation, but it is adapted to be readily released from the shaft and turned upon it to change the angular position of the spiral mold-board.

Referring to Figs. 2 and 3, it will be seen that the lower end of the sleeve 28 is formed with notches 30 which act as key-seats for the reception of a key 31 which is secured in the shaft 13. This arrangement positively prevents the sleeve 28 and mold-board 22 from being accidentally turned, and provides means whereby the mold-board may be readily placed in its proper positions of adjustment. The sleeve 28 rests upon a nut 32 threaded upon a screw-threaded portion 33 of the shaft 13 and a lock-nut 34 below the nut 32 operates to positively lock it in place in any position of adjustment upon the shaft. This provides means whereby the mold-board may be lowered to bring the knife or scraper 23 into neat contact with the inner face of the bowl 14 in case of wear upon the knife or scraper. The upper end of the shaft 13 is screw-threaded and a nut 35 is secured upon said threaded ends and bears against the top of the sleeve 28 to lock it in place upon the shaft 13.

A fragment of a proofing apparatus is illustrated at 36 in Figs. 1 and 2. It contains feeding mechanism (not shown) located in a receiver 37 which has an opening 38 at the top through which the lumps of dough are delivered to the proofing apparatus. The mold-board is shown (in full lines) in the position occupied for discharging the lumps of dough into the receiving opening of the proofing apparatus. At one side of the bowl 14 is a pan or table 39 which may be supported from the base 10 by a bracket or arm (not shown) and said pan or table is adapted to receive lumps of dough from the rounder whenever it is not desired to deliver them to the proofing apparatus. Inasmuch as the upper end of the spiral mold-board determines the place where the lumps of dough are discharged from the rounder, the mold-board can be set to bring its discharge end in front of the pan or table 39 and the lumps of dough will thereupon be delivered to said pan or table. The mold-board may be adjusted in this manner by merely loosening the nut 35, raising the sleeve 28 and therewith the mold-board sufficiently to disengage the sleeve from the key 31 and then turning the sleeve and mold-board upon the shaft 13, bringing one of the opposite notches into register with the key and lowering the sleeve and mold-board. The nut 35 being screwed up, the mold-board is held in position for discharging the lumps of dough upon the pan or table 39.

In operation the lumps of dough are fed into the lower end of the groove between the mold-board and bowl and are acted upon by the surfaces thereof as usual and rolled upward along the spiral mold-board, finally being discharged at the upper end thereof into the proofing apparatus or upon the pan or table 39, depending upon the position of the mold-board. As has been heretofore explained, said mold-board may be readily adjusted from one position to another by loosening the nut 35 and shifting the mold-board and its sleeve upon the shaft.

From the above it is obvious that a rounding up machine provided with adjusting means for the mold-board may be installed permanently in place between the divider and proofing apparatus for delivering lumps of rounded up dough to the proofing apparatus, and that the mold-board may be quickly adjusted to discharge the lumps of dough at either side of the machine. Furthermore, by properly adjusting and fitting the mold-board to the bowl and then permanently securing it to the sleeve, a unitary structure is provided which may be moved as a whole and readily adjusted to several operative positions without disturbing the connections between the mold-board and sleeve.

More or less variation of the exact details of construction is possible without departing from the spirit of this invention; I desire, therefore, not to limit myself to the exact form of the construction shown and described, but intend, in the following claims to point out all of the invention disclosed herein.

What I claim as new and desire to secure by Letters Patent is:

1. In a machine of the character described, the combination of a rotary carrier, a mold-board coöperating therewith and having a rigidly attached supporting sleeve, a fixedly supported shaft upon which said sleeve is held, and means for stationarily holding said sleeve on said shaft and therewith the mold-board in various positions of adjustment.

2. In a machine of the character described, the combination of a rotary dough-carrying bowl, a spiral mold-board coöperating therewith and having a rigidly attached supporting sleeve, a fixedly supported shaft upon which said sleeve is held, and means for stationarily holding said sleeve on said shaft and therewith the mold-board in various positions of adjustment.

3. In a machine of the character described, the combination of a rotary dough-carrying bowl, a stationary spiral mold-board coöp- erating therewith, supporting arms secured to said mold-board, a supporting sleeve permanently secured to said arms, a fixedly supported shaft upon which said sleeve is stationarily supported, said sleeve and therewith the mold-board, being capable of angular adjustment upon said shaft, and means for securing said sleeve and therewith the mold-board upon said shaft at the various positions of adjustment.

4. In a machine of the character described, the combination of a rotary dough-carrying bowl, a stationary spiral mold-board coöperating therewith, supporting arms secured to said mold-board, a supporting sleeve permanently secured to said arms, a stationarily supported shaft upon which said sleeve is stationarily supported, said sleeve and therewith the mold-board, being capable of angular adjustment upon said shaft, coöperating means between the sleeve and shaft for fixing the angular position of the sleeve and mold-board, and means for securing said sleeve and therewith the mold-board upon said shaft at the various positions of adjustment.

5. In a machine of the character described, the combination of a rotary dough-carrying bowl, a stationary spiral mold-board coöperating therewith, supporting arms secured to said mold-board, a supporting sleeve permanently secured to said arms, a stationarily supported shaft upon which said sleeve is stationarily supported, said sleeve and therewith the mold-board, being capable of angular adjustment upon said shaft, said sleeve having angularly disposed notches in its lower end, a key secured in said shaft and adapted to enter any of said notches to fix the angular position of said sleeve and mold-board, and means for securing said sleeve and therewith the mold-board upon said shaft at the various positions of adjustment.

6. In a machine of the character described, the combination of a rotary dough-carrying bowl, a stationary spiral mold-board coöperating therewith to round up lumps of dough, and mold board supporting means controlled by one locking element for holding said mold-board in various predetermined positions of angular adjustment, whereby the lumps of dough may be discharged at various predetermined places around the bowl.

7. In a machine of the character described, the combination of a rotary dough-carrying bowl, a stationary spiral mold-board coöperating therewith to round up lumps of dough, a stationary element and coöperating means connected with the mold-board for fixing the angular position of said mold-board, and one element for securing said mold-board in such position.

8. In a machine of the character described, the combination of a rotary dough-carrying bowl, a stationary spiral mold-board coöperating therewith to round up lumps of dough, a stationary shaft supported coaxially with said bowl, a shoulder on said shaft, a sleeve supported by said shoulder and fixedly connected to said mold-board, and clamping means on said shaft for clamping said sleeve upon said shoulder in various positions of angular adjustment, whereby the lumps of dough may be discharged from the said bowl at various places around its edge.

9. In a machine of the character described, the combination of a rotary dough-carrying bowl, a stationary spiral mold-board coöperating therewith to round up lumps of dough, a stationary shaft supported coaxially with said bowl, a vertically adjustable shoulder on said shaft, a sleeve supported by said shoulder and fixedly connected to said mold-board, and clamping means on said shaft for clamping said sleeve upon said shoulder in various positions of angular adjustment, whereby the lumps of dough may be discharged from the said bowl at various places around its edge.

10. In a machine of the character described, the combination of a rotary dough-carrying bowl, a stationary spiral mold-board coöperating therewith to round up lumps of dough, a stationary shaft supported coaxially with said bowl, a nut threaded on said shaft, a sleeve supported by said nut and fixedly connected to said mold-board, and clamping means on said shaft for clamping said sleeve upon said nut in various positions of angular adjustment, whereby the lumps of dough may be discharged from the said bowl at various places around its edge.

PAUL B. STREICH.